March 14, 1950
J. SCHUNK
2,500,297
WEATHER STRIP FOR BUS OR CAR WINDOW CONSTRUCTION
Filed Nov. 23, 1944
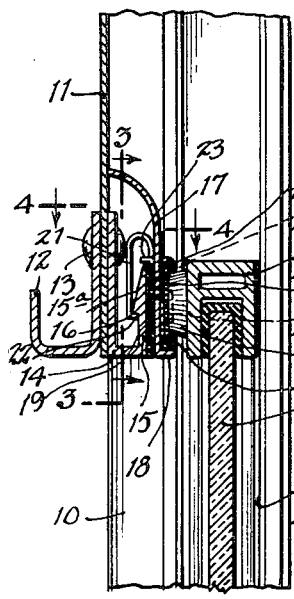
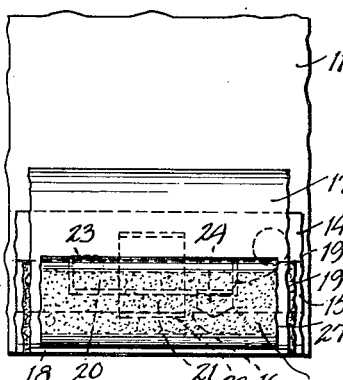
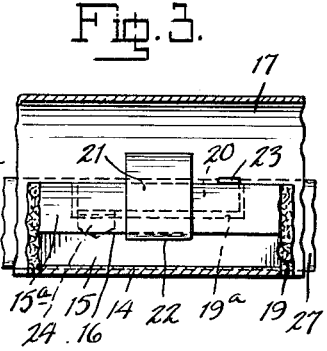
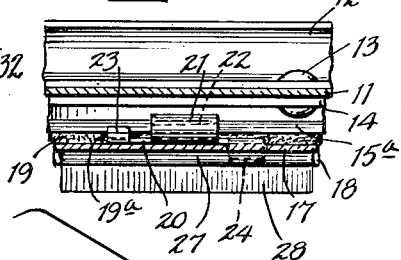
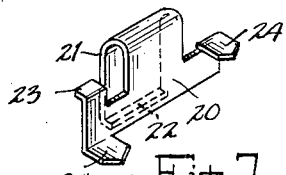
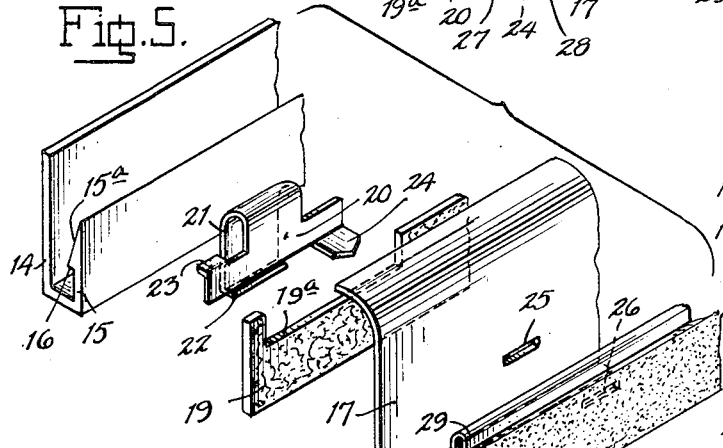
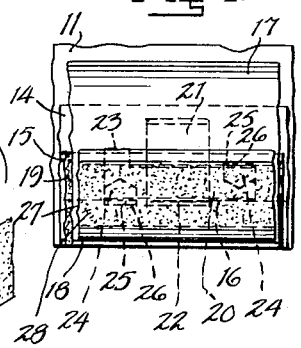
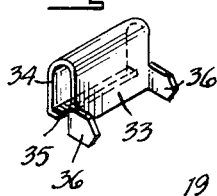
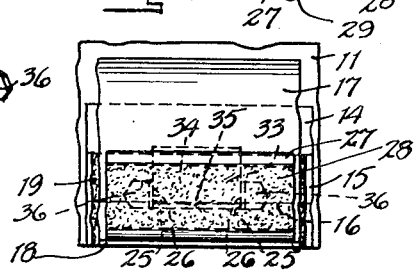
INVENTOR
JOSEPH SCHUNK
BY
ATTORNEY Patented Mar. 14, 1950

2,500,297

UNITED STATES PATENT OFFICE 2,500,297

WEATHER STRIP FOR BUS OR CAR WINDOW CONSTRUCTION

Joseph Schunk, Union, N. J., assignor to The National Lock Washer Company, Newark, N. J., a corporation of New Jersey Application November 23, 1944, Serial No. 564,815

3 Claims. (Cl. 20—69)

The present invention relates to an improvement in weather strip for bus or car window construction, and particularly to the weather stripping structure provided as a seal between the top or header rail of the window frame and the top rail of the window sash disposed in the window frame for raising and lowering movement, it being particularly proposed to provide weather stripping which may be rapidly installed in the bus structure without the use of screws, bolts, or the like, as previously employed. It is also an object to provide a weather stripping structure dispensing with the use of bolts, screws, and the like, and wherein the necessity for drilling and tapping holes for bolts, screws, and the like, is consequently eliminated.

A further object is to provide a weather stripping structure including spring clip means through which the weather strip element is adapted to be installed by a snap-on action, the spring clip means adapted to be snapped into interlocking engagement with a cooperating retaining structure of the bus construction.

Another object is to provide a weather stripping structure which will be securely held against looseness, and which when once installed will not be easily susceptible to unauthorized removal or tampering with.

Another object is to provide a weather stripping structure in which the weather strip element, comprising a supporting base and a carpet weather strip insert, may be conveniently and rapidly removed and replaced by a new carpet weather strip element, without disturbing the assembled relation of the snap-on clip means or the weather strip supporting structure carried thereby.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a vertical sectional view of the header structure of a bus or car window construction, showing the weather stripping structure installed, and the top rail of the window sash engaged therewith.

Fig. 2 is a front elevation of the weather stripping structure as view from the inside of the bus, the window sash being removed.

Fig. 3 is a vertical longitudinal sectional view, taken along the line 3—3 of Fig. 1.

Fig. 4 is a horizontal longitudinal sectional view, taken along the line 4—4 of Fig. 1.

Fig. 5 is an isometric perspective view, showing the several parts of the weather stripping structure in extended separated relation.

Fig. 6 is an isometric perspective view of a modified form of attaching clip, according to the invention.

Fig. 7 is a front elevation showing the clip, as illustrated in Fig. 6, in its assembled relation with the weather stripping structure.

Fig. 8 is an isometric perspective view of another modified form of attaching clip, according to the invention.

Fig. 9 is a front elevation, showing the clip as illustrated in Fig. 8, in its assembled relation with the weather stripping structure.

Similar reference characters indicate corresponding parts throughout the several figures of the drawings.

Referring to the drawings, the window frame of the bus, with which the weather stripping structure is associated, comprises an upright vertical post 10 at each side of the window opening, and a header plate 11 forming the upper side of the opening, this header plate being provided on its outer side adjacent its lower edge with a drip moulding 12, secured thereto by rivets 13 which also secure to the inner side of the plate adjacent its lower edge a header rail 14.

The header rail 14 is of L-shape in cross-section and includes at the edge of its laterally projected base an upwardly projecting flange 15, provided at the upper portion of its inner face with an inclined wedge surface 15ª terminating in a longitudinally extending retaining shoulder 16, disposed in spaced relation to the projected base. The header rail constitutes a rigidly secured permanent part of the bus structure, and the weather strip assembly is adapted to be attached thereto by snap-on engagement with the retaining shoulder 16 thereof.

The weather strip assembly comprises a weather strip supporting plate 17, curved at its upper portion into engaging relation with the inner surface of the header plate 11, and adapted in assembled relation to be disposed in spaced parallel relation to the flange 15 of the header rail, an outwardly bent supporting lip 18 being provided at its lower edge to provide a support for the weather strip element, as will presently more fully appear. Upon the inner side of the plate 17 there is cemented, or otherwise suitably attached, a longitudinally extending packing strip 19, of felt or the like, adapted in the attached relation of the weather strip assembly to be disposed in tight sealing relation between the opposed surfaces of the flange 15 of the header rail and the plate 17. At suitable intervals along its upper edge of the packing strip is provided with rectangular cut outs 19ᵃ for the purpose of clearing the snap-on clips.

The snap-on clips are provided at suitable spaced points along the weather strip assembly, as for instance at the center and near each end of the top rail of the window sash, and each comprises a sheet metal member formed of suitable metal having a degree of springiness to permit the snap-on action, as well as a degree of ductility to permit bending of the retaining lugs forming part thereof. Each clip consists of a flat plate portion 20 provided with a tongue 21 extending upwardly from its upper edge and bent downwardly into inverted U-form to provide a spring leg disposed in spaced and opposed relation to the plate portion 20, a right angularly extending retaining lip 22 being provided at the lower end of the spring leg for locking engagement with the shoulder 16 of the header rail. At one end the plate portion 20 is provided at its upper edge with a right angularly extending stop lug 23, adpated in the assembled relation of the clip to engage the upper edge of the flange 15 of the header rail, and at its other end is provided at its lower edge with a right angularly extending bendable lug 24, preferably of pointed form at its outer end.

The lug 24 of the snap-on clip is engageable through a slot 25 in the weather strip supporting plate 17, and is also engageable through a slot 26 provided in the base strip 27 of the carpet weather strip element 28, the felt backing of this carpet weather stripping being secured at its longitudinal edges to the base strip 27 by means of retaining flanges 29—29 at each of the longitudinal edges of the base strip. In attaching the clip to the weather strip supporting plate 17 and the weather strip element supported upon the lip 18 thereof, the lug 24 is engaged through the slots 25 and 26, and is then forced through the felt backing of the carpet weather strip element, where it is bent at right angles against the felt backing to retain the parts in assembled relation, as shown clearly in Fig. 1. This arrangement permits convenient and rapid removal and replacement of the weather strip element, simply by bending the lug into a straight relation.

The weather strip assembly comprising the weather strip supporting plate 17, the packing strip 19 cemented thereto, the snap-on clips, and the carpet weather strip element, is attached to the header rail by engaging it above the flange 15 and then forcing it downwardly, the spring leg of each snap-on clip being sprung outwardly through engagement with the wedging surface 15ᵃ as the weather strip assembly is moved downwardly and snapping into place as the retaining lip 22 moves beneath the shoulder 16. In this engaged relation the stop lug 23 of each snap-on clip abuts the upper edge of the flange 15 of the header rail, thus fixing the position of the weather strip assembly against downward displacement upon the header rail, the retaining lug 22 engaged with the shoulder 16 fixing it against upward displacement.

In operation, the carpet weather strip element engages the outer side of the top rail 30 of the window sash 31 to provide a weather seal in the closed position of the sash, while permitting the sash to be raised and lowered in the sash guides 32 carried upon the side posts 10.

In Figs. 6 and 7 there is shown a modified form of snap-on clip, substantially similar to the spring clip shown in the first embodiment, but provided with two attaching lugs 24, one being at the same end of the plate portion 20 as the stop lug 23, but projecting outwardly from the lower edge, while the other lug 24 is at the opposite end and projects outwardly from the upper edge. The weather strip supporting plate 17 and the base strip 27 of the carpet weather strip 28 are respectively provided with two slots 25 and two slots 26 to receive the two lugs 24, upper lug 24 being bent downwardly and the lower lug 24 being bent upwardly, as shown in Fig. 7, to attach the carpet weather strip to the supporting plate.

In Figs. 8 and 9 there is shown another modified form of snap-on clip comprising a sheet metal member bent into inverted U-shape to provide a forward plate portion 33 and a rearward spring leg portion 34, the latter being provided at its lower edge with a retaining lip 35. At the lower end portions of the vertical side edges of the plate portion 33 there are provided forwardly projecting attaching lugs 36—36. The over-all height of the clip is relatively shorter than the clips of the other embodiments, and instead of the stop lug 23, provided in these other embodiments for engaging the upper edge of the flange 15, the bend of the inverted U-shape member engages the upper edge of the flange to limit the downward movement of the clip, this bend engaging the upper end of the flange as the retaining lip 35 engages beneath the shoulder 16. The attaching lugs 36—36 are engaged in two slots 25 and in two slots 26 respectively provided in vertical arrangement in the weather strip supporting plate 17 and in the base strip 27 of the carpet weather strip 28, and are bent outwardly into flat engagement with the felt backing of the carpet weather strip.

I have illustrated and described preferred and satisfactory embodiments of the invention, but it will be understood that changes may be made therein, within the spirit and scope thereof, as defined in the appended claims.

Having thus described my invention, what is claimed and desired to be secured by Letters Patent is:

1. A weather strip assembly adapted to be secured to a rail member having inner and outer sides and provided at its inner side with a shoulder disposed at a predetermined distance from its upper edge comprising a weather strip element having a slot at its inner side, and a U-shape clip member disposed at the inner side of said weather strip element engageable over said rail member having an outer leg engageable with the outer side of said rail member and provided with a bendable securing lug projecting outwardly therefrom and engaged in said slot, and the other leg being a spring leg engageable with the inner side of said rail member, and having a retaining lip adapted to engage beneath said shoulder of rail member.

2. A weather strip assembly adapted to be secured to a rail member having inner and outer sides comprising a weather strip supporting plate member having a slot, a weather strip element disposed at the outer side of said plate member and having a slot, a U-shape clip member disposed at the inner side of said plate member engageable over said rail member having an outer leg engaged with the outer side of said rail member and provided with a bendable securing lug projected outwardly therefrom and engaged through said slot of said plate member and secured by bending in said slot of said weather strip element, the other leg being a spring leg engageable with the inner side of said rail member.

3. A weather strip assembly adapted to be secured to a rail member having inner and outer sides comprising a weather strip supporting plate member having an outwardly projecting weather strip supporting lip at its lower edge and having a slot upwardly spaced from said lip, a weather strip element disposed at the outer side of said plate member and supported on said lip, a U-shape clip member disposed at the inner side of said plate member engageable over said rail member having an outer leg engaged with the outer side of said rail member and provided with securing means projecting outwardly therefrom and extended through said slot of said plate member and connected to said weather strip element, the other leg being a spring leg engageable with the inner side of said rail member.

JOSEPH SCHUNK.

REFERENCES CITED

The following references are of record in the file of this patent:

UNITED STATES PATENTS

| Number | Name | Date |
|---|---|---|
| 1,739,057 | Rock | Dec. 10, 1929 |
| 1,931,713 | Walper | Oct. 24, 1933 |
| 2,148,847 | Wiley | Feb. 28, 1939 |
| 2,153,972 | Murphy | Apr. 11, 1939 |
| 2,198,290 | Place | Apr. 23, 1940 |
| 2,216,219 | Wiley | Oct. 1, 1940 |
| 2,299,598 | Schlegel | Oct. 20, 1942 |
| 2,390,750 | Tinnerman | Dec. 11, 1945 |

FOREIGN PATENTS

| Number | Country | Date |
|---|---|---|
| 489,081 | Great Britain | July 19, 1938 |